United States Patent [19]

Clark

[11] 4,016,078
[45] Apr. 5, 1977

[54] HEADER BLOCK FOR TUBULAR MEMBRANE PERMEATOR MODULES

[75] Inventor: George B. Clark, Clayton, Calif.

[73] Assignee: The Dow Chemical Company, Midland, Mich.

[22] Filed: Mar. 6, 1975

[21] Appl. No.: 556,055

[52] U.S. Cl. .............................. 210/94; 210/339; 210/433 M

[51] Int. Cl.² ........................................ B01D 31/00

[58] Field of Search ........ 210/94, 336, 339, 433 M, 210/236 H, 321 R, 323 T

[56] References Cited

UNITED STATES PATENTS

| | | | |
|---|---|---|---|
| 3,608,730 | 9/1971 | Blaha | 210/323 T X |
| 3,610,418 | 10/1971 | Calderwood | 210/336 X |
| 3,612,282 | 10/1971 | Cheng | 210/321 R |
| 3,698,559 | 10/1972 | Manjikian | 210/321 R |
| 3,722,694 | 3/1973 | Agranat | 210/321 R |

*Primary Examiner*—Frank A. Spear, Jr.
*Attorney, Agent, or Firm*—Robert R. Stringham

[57] ABSTRACT

An improved header block for tubular membrane permeator modules, which has particular advantage for ultrafiltration operations, is disclosed. The header block is very compact and is formable by casting or molding and machining. In cooperation with a collector plate and end-plate, it provides both feed (or concentrate) and permeate manifolds. The high pressure differentials and/or cumbersome "turn arounds" or manifolds heretofore used are obviated by said block. A plurality of modules comprising such blocks may be joined side-by-side, in cooperation with appropriate side-plate and gasket means, to provide a variety of flow distributions and/or modes. The header block is uniquely appropriate for handling high volume flow rates required to ensure turbulent, high velocity flow of feed liquid within each permeator tube. The end plates preferably are transparent, to permit facile inspection of the permeate stream from each tube in each module.

10 Claims, 17 Drawing Figures

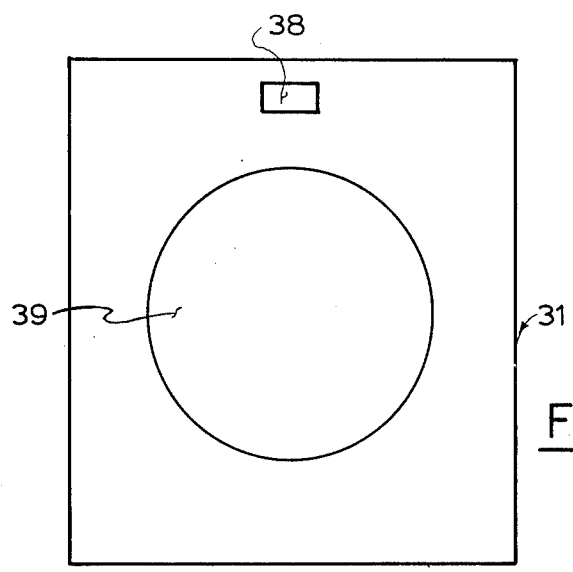
FIG. 10
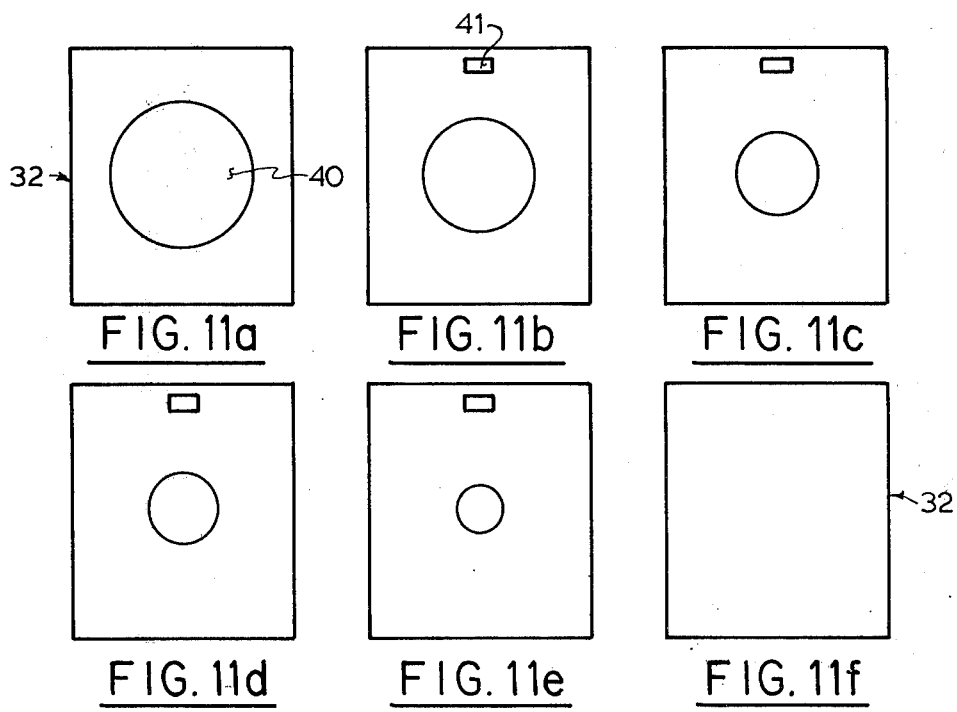
FIG. 11a  FIG. 11b  FIG. 11c
FIG. 11d  FIG. 11e  FIG. 11f

HEADER BLOCK FOR TUBULAR MEMBRANE PERMEATOR MODULES

BACKGROUND OF THE INVENTION

A considerable development of membrane technology has taken place within recent years. The number of commercial applications of permeability separation processes, such as dialysis, ultrafiltration and reverse osmosis is increasing rapidly. One type of permeability separatory device — i.e., "permeator" — which has come into use employs membranes in tubular form. In one such type of device, the membrane is formed or emplaced as a skin on an interior or exterior surface of a rigid supporting tube which is grooved, perforated or has an open porous structure through which permeate can readily pass. For example, see U.S. Pat. Nos. 3,542,204; 3,581,900; 3,666,109; 3,708,069 and 3,734,297, which constitute the closest prior art known to the applicant.

Conventional tubular modules, as represented by the foregoing patents, are designed primarily for reverse osmosis. However, it has been a general practice to use these modules for ultrafiltration applications, disregarding the different requirements with respect to the distribution of the higher flow rates involved. Ultrafiltration (UF) applications, especially those involving tacky, viscous or gelpolymerizing solutions require very high flow rates to prevent blinding of the membrane surfaces by deposited solids or gels. Linear flow velocities of 10 to 25 feet per second are not uncommon.

For example, in a typical UF operation with a module of the present invention, a latex suspension has been found to require a velocity of 15 ft./sec. for continuous concentration by UF. This necessitates a flow rate of 8.5 gallons per minute through each one-half inch I.D. tube (membrane on the interior surface thereof) in the module. Thus, a seven tube module requires a total flow of almost 60 gallons per minute through whatever manifold means is employed. In order to achieve such flows, the manifold means must either be adpated to accommodate high pressures or must be sized much larger than in comparable reverse osmosis modules. Often, the large size connecting "U" turns and ancillary fittings approach the tube arrays themselves in cost and bulk.

The above listed U.S. Pat. No. 3,734,297, which discloses the nearest prior art header design known of, is directed to a reverse osmosis module having a ladder-like configuration. The ends of a parallel array of permeable tubes are connected to cylindrical end members into which are inserted plugs having flow directing channels. In this module the feed solution is passed, under pressure, over a semi-permeable membrane layer on the outer surface of each tube and permeate is withdrawn from the interior of each tube through individual conduits which are passed through one end member and through the flow-directing plug therein, perpendicular to the axis of the end member. This design provides for facile replacement of individual permeator tubes but does not permit very efficient space utilization. A further disadvantage is that such modules are not well adapted to be ganged (joined with other such modules) end-to-end. Also, in order to change the relative flow rates or directions between two or more of the tubes in a given module, plug replacement is necessary. Moreover, since the module is not designed for permeation through the tube walls from the inside out, the difficulties of flow distribution inherent in the opposite mode of operation cannot be avoided.

U.S. Pat. No. 3,763,376 discloses a device in which a window and a light source are utilized, in conjunction with a haemodialyzer, to monitor dialysate for blood.

OBJECTS OF THE INVENTION

It is an object of the present invention to provide:
1. a tubular permeator module which is particularly suitable for operation as an ultrafilter;
2. a compact header block which is readily made from inexpensive materials;
3. extreme flexibility of arrangement in ganging modules for various flow modes;
4. readily and accurately controlled flow distribution between different modules ganged together;
5. operation in the mode most suitable for good flow distribution within each permeator tube; i.e., — permeation from the inside out;
6. simple, facile monitoring of each permeator tube for blockage or leakage;
7. ready replacement of a defective header, module or permeator tube therein; and
8. efficient utilization of plant space.

Other objects will be apparent from the following description.

SUMMARY OF THE INVENTION

In its broadest embodiment, the invention is a header block having:
1. two opposed planar faces, joined by a feed bore through said block, the axis of said bore being generally perpendicular to each of said faces;
2. a third planar face, to which said bore axis is parallel, connected to the bore and pierced by a plurality of generally parallel fluid passageways terminating in said bore, the walls defining the portions of said passageways adjacent said third face being adapted to receive, position, and, in cooperation with suitable sealing means, to sealingly engage the terminal portions of tubes inserted therein;
3. a fourth planar face, opposed and generally parallel to said third face and connected thereto by a plurality of permeate conduits which pass through said block and are not connected with said feed bore.

Preferably, the total cross-sectional area of said fluid passageways is not greater than the cross-section area of the feed bore they connect with.

A second embodiment of the invention is a block, as above described, having said fourth face sealingly engaged with a generally planar surface of an end plate, the resulting assembly being adapted by grooves in said face or in said surface to receive and conduct away permeate issuing from the permeate conduits in the block. Preferably, the assembly is also adapted by one of said grooves, in cooperation with suitable intervening sealing means, to receive and pass on permeate discharged from an adjacent such assembly. It is highly preferable that the end plate be transparent, so that the permeate stream from each of said conduits can be observed before it is comingled with other such streams. Monitoring of permeate streams which are not electrically conducting — i.e., which do not contain electrolytes — is thus provided for, and without resort to an internal light source or electro-optical sensing means.

A third embodiment of the invention is a block as above described, the third face of which is sealingly engaged with a first generally planar surface of a permeate-collecting plate having a second generally planar surface opposed and parallel to said first surface. The plate is pierced through by permeate conducting bores which connect said surfaces and register and communicate with the corresponding permeate conduits in the block. Similarly, the plate is pierced through by passageways which register and communicate with the fluid passageways in the block. The portion of each of said passageways in the plate adjacent to the second surface thereof is enlarged by recessing the wall of said portion to define an annular interior shoulder and each enlarged portion is connected to one of the permeate bores piercing the plate by a groove in said second surface, preferably of such depth as to extend to said shoulder. The diameter of the non-enlarged portion of each passageway through the plate is essentially the same as that of the portion of the corresponding passageway in the block, the wall of which is adapted to receive a tube end.

Suitable intervening gasket means is adapted, in co-operation with the block and collecting plate, to prevent flow of feed other than in the interior of tubes inserted in the passageways.

An additional embodiment of the invention is a block, gasket and collector plate assembly (as described immediately above), in which the second surface of the plate is sealingly engaged with a generally planar face of a tube-sheet member in which are fixed terminal portions of a parallel array of rigid, impermeable support tubes having longitudinal, permeate directing grooves in their interior surfaces and containing closely fitting permeable tubes, the terminal portions of which are impermeable and extend through intervening sealing means fitting loosely thereabout, through the collecting plate and intervening tight-fitting gasket means, and are received in the passageways in said block adapted to that purpose.

The sealing means on each side of the collector plate are adapted, in cooperation with the plate, to ensure that permeate is conducted from the ends of the grooves inside the support tubes along the impermeable portions of the exterior surfaces of the inner tubes to the spaces between them and the enlarged portions of the passageways in the plate and is confined in its flow therefrom to the collecting grooves and permeate bores in the plate.

Preferably, the permeable portions of the inner tubes are of a porous structure. The tubes are coated — preferably interiorly — with a thin, selectively permeable membrane.

Desirably, the ends of the outer, impermeable tubes are potted in a resinous material which constitutes the tube-sheet member.

Optionally, the assembly includes an end plate, as above described.

The assembly is held together under sufficient pressure to compress the gaskets used, by clamping or connecting means — such as bolts passing through the end-plate, block, collector plate and tube sheet. Conveniently, the threaded bolt-ends are received in mating female threads in bores in the tube sheet member.

BRIEF DESCRIPTION OF THE DRAWINGS

FIG. 10 is a plan view of a gasket to be used between adjacent header-block/end-cap assemblies in a ganged array as shown in FIG. 9.

FIGS. 11a, 11b, 11c, 11d, 11e and 11f are plan views of a series of rigid baffle plates having successively smaller central openings (orifices) and adapted to be inserted each between two gaskets (of the type shown in FIG. 10) positioned between successive header block/end plate assemblies in a ganged array of modules.

DESCRIPTION OF THE PREFERRED EMBODIMENT

Figure 1:
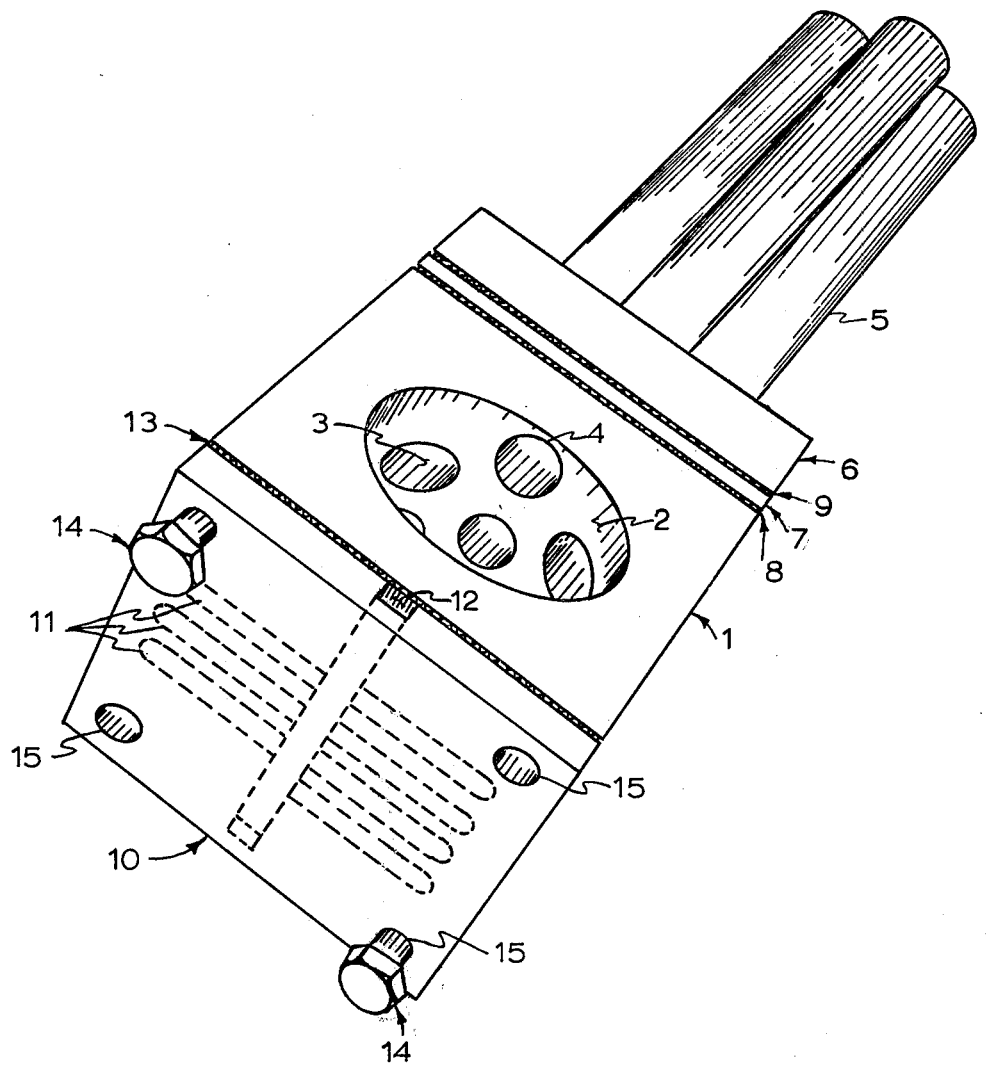
FIG. 1 is a perspective view of an assembled permeator module consisting of a transparent end-plate, a header block, a collector plate, a tube sheet, a parallel, hexagonal array of seven permeator tubes, two gaskets and two bolts.
Figure 5:
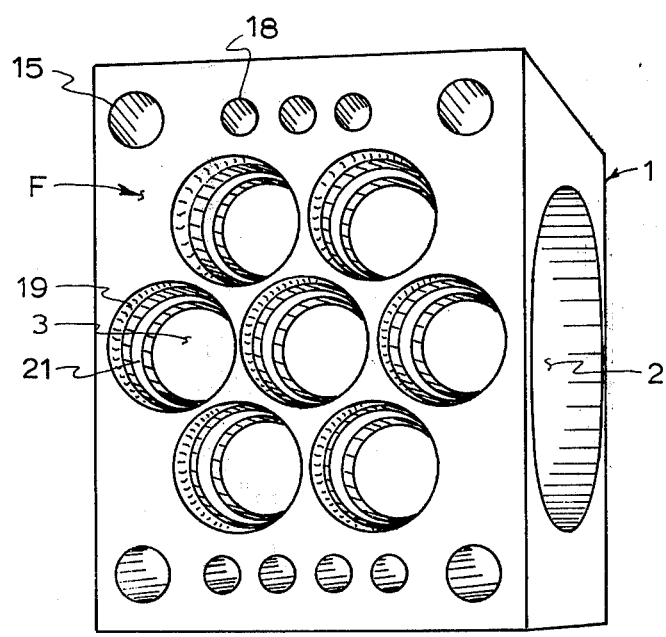
Figure 6:
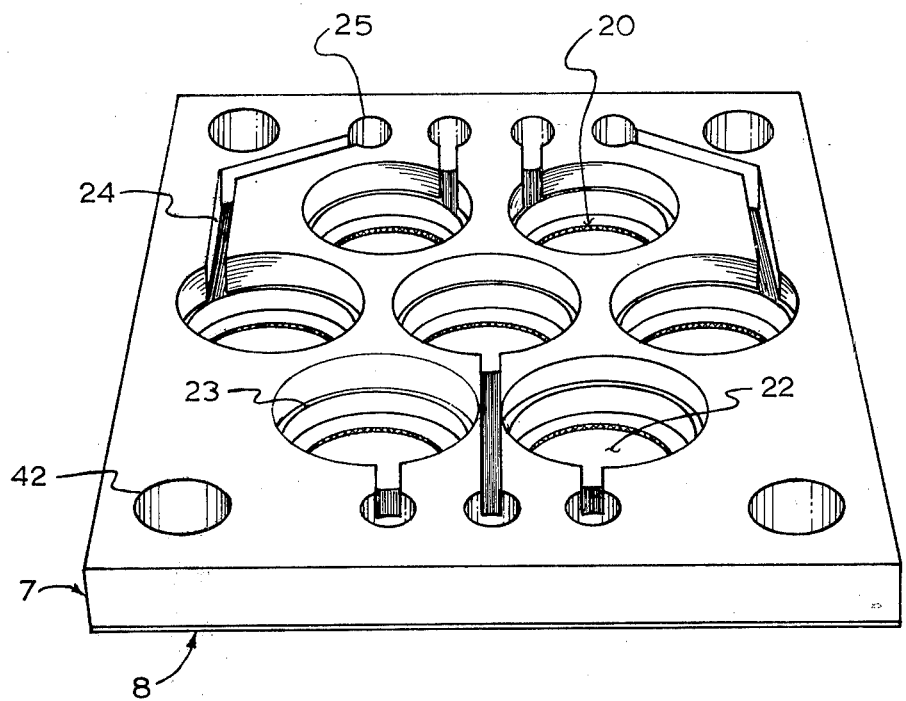
FIG. 6 is a perspective view of the permeate collecting plate and the cooperating gasket between the plate and the block in the assembly of FIG. 1.

Referring to FIG. 1, there is shown a cast, aluminum-filled epoxy, header block 1 defining a feed bore 2 and feed passageways 3 communicating with and having positioned therein terminal, impermeable portions 4 of permeable tubes (not visible) extending from and closely fitting in impermeable support tubes 5 which are fixed (potted) in an aluminum-filled epoxy resin tube-sheet member 6. Intervening between the block 1 and the tube-sheet member 6 is a permeate-collecting plate 7 and sealing means (rubber gaskets) 8 and 9, details of which are shown in FIG. 5 and 6. A transparent plastic end-plate 10 having interior permeate collecting grooves 11 (shown in phantom) and a permeate conducting channel 12 is urged against an intervening sealing gasket (or adhesive layer) 13 by bolts 14 which pass through holes 15 in the end-plate, through corresponding bores in the block, gaskets and collecting plate and thread into threaded bores (not visible) in the tube-sheet member.

Figure 2:
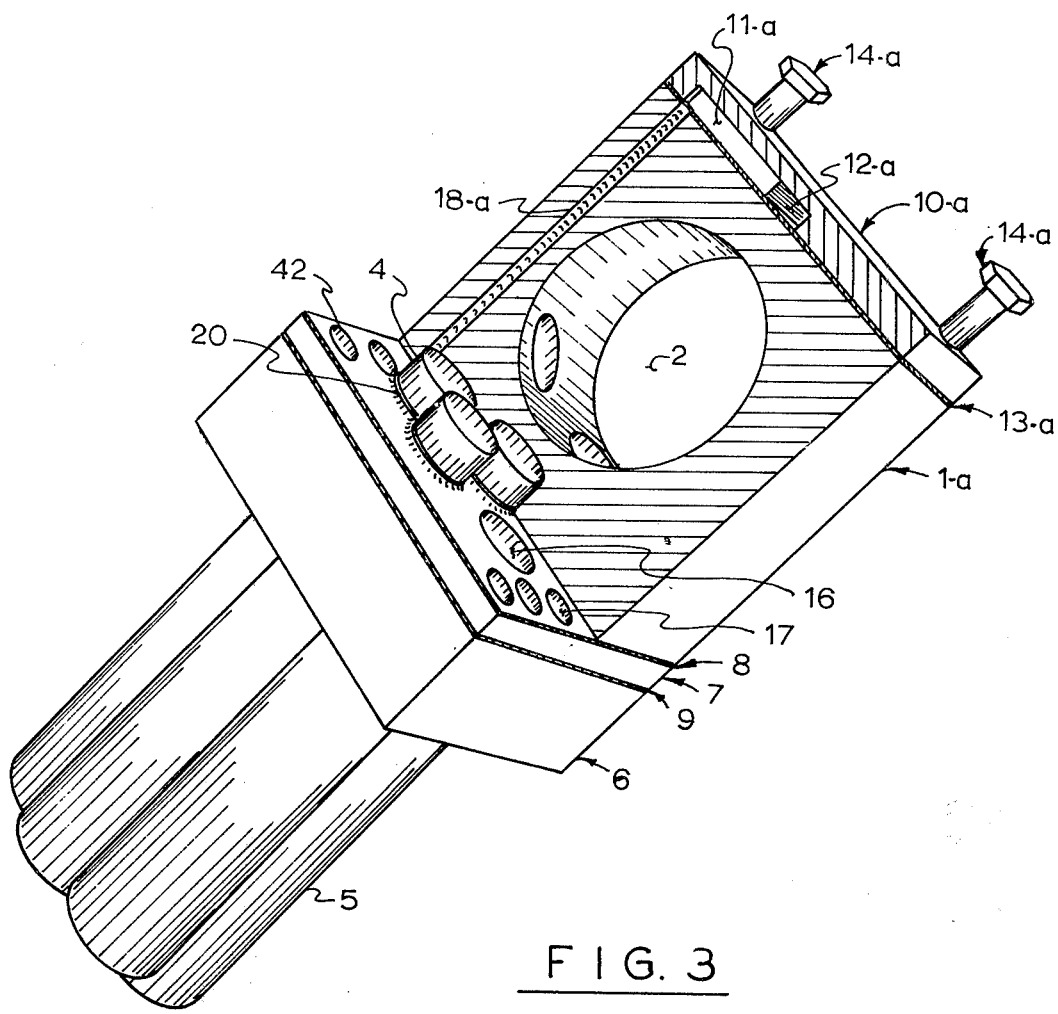
FIG. 2 is a perspective view of an assembly as in FIG. 1 but with half of the end-plate and block cut away.

FIG. 2 shows details of the gasket 8 and manner in which the gasket material is stretched by the tightly conformed to the terminal tube portions 4 protruding through gasket openings 16 which are smaller in diameter than the tubes. Also shown are openings 17 which register with permeate conduits through the header block. The mating portions of such a conduit, bisected longitudinally by the cut made, are numbered 18a and 18b. The openings 17 also register with corresponding permeate bores through the plate 7. Also shown are openings in gasket 8 in registration with bolt holes 42 in plate 7 (see FIG. 6). The visible portion of a passageway (3, in FIG. 1), bisected longitudinally by the cut, is numbered 3b. The enlarged portion 19 of passageway 3 (a and b) fits closely around the stretched, protruding portion (lip) 20 of the gasket 8. Two halves of a permeate collecting groove, 11a and 11b in end-plate 10, are shown as exposed by the cut.

Figure 3:
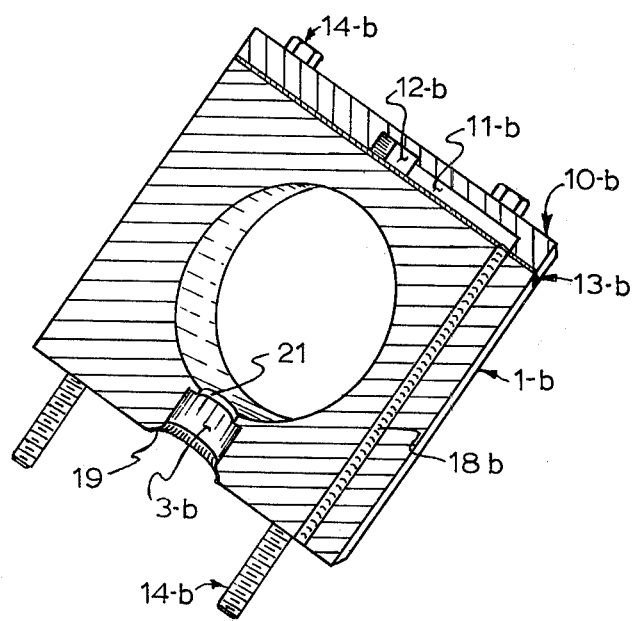
FIG. 3 is a perspective view of the cut-away portion.
Figure 4:
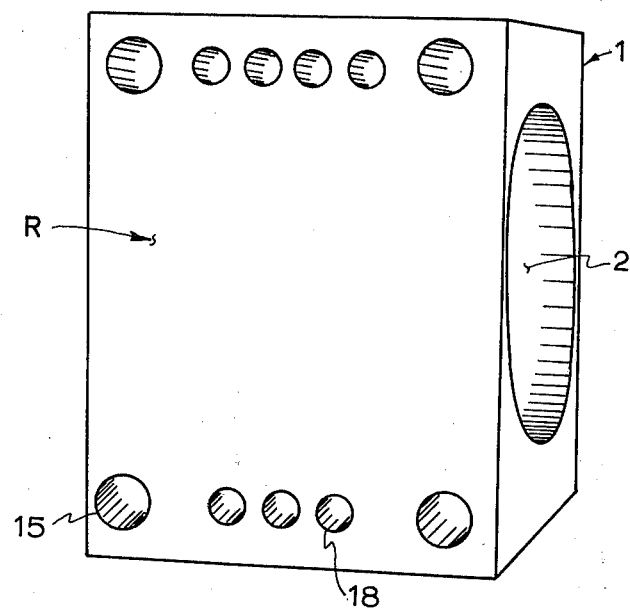
FIGS. 5 and 4 are "front" and "rear" elevation views respectively of the header block in the assembly of FIG. 1, showing the bolt holes, permeate conduits and feed passageways.

FIG. 3 and 4 show opposed faces (F and R) of header block 1, joined by permeate conduits 18 and bolt holes 15. A group of seven passageways 3 connect face F with feed bore 2. The wall of the enlarged portions 19 of the passageways adjacent face F are adapted to support the stretched, protruding portions ("lips"; reference number 20 in FIG. 2) of a gasket (8, in FIG. 2) and the walls of the restricted portions 21 are adapted to receive tube ends (4, in FIG. 2).

FIG. 6 shows the permeate collecting plate 7 of FIG. 1 and (through the passageways 22) the portions (20, in FIG. 2) of an adhered gasket 8 adapted to elastically embrace the tube ends (4, in FIG. 2). Also shown are shoulders 23 defined by enlargement of the passageways 22 and grooves 24 connecting the enlarged portions to permeate bores 25 which pierce the plate and register with corresponding openings (17, in FIG. 2) in gasket 8. Holes 42 at each corner of the plate are bolt holes.

Figure 7:
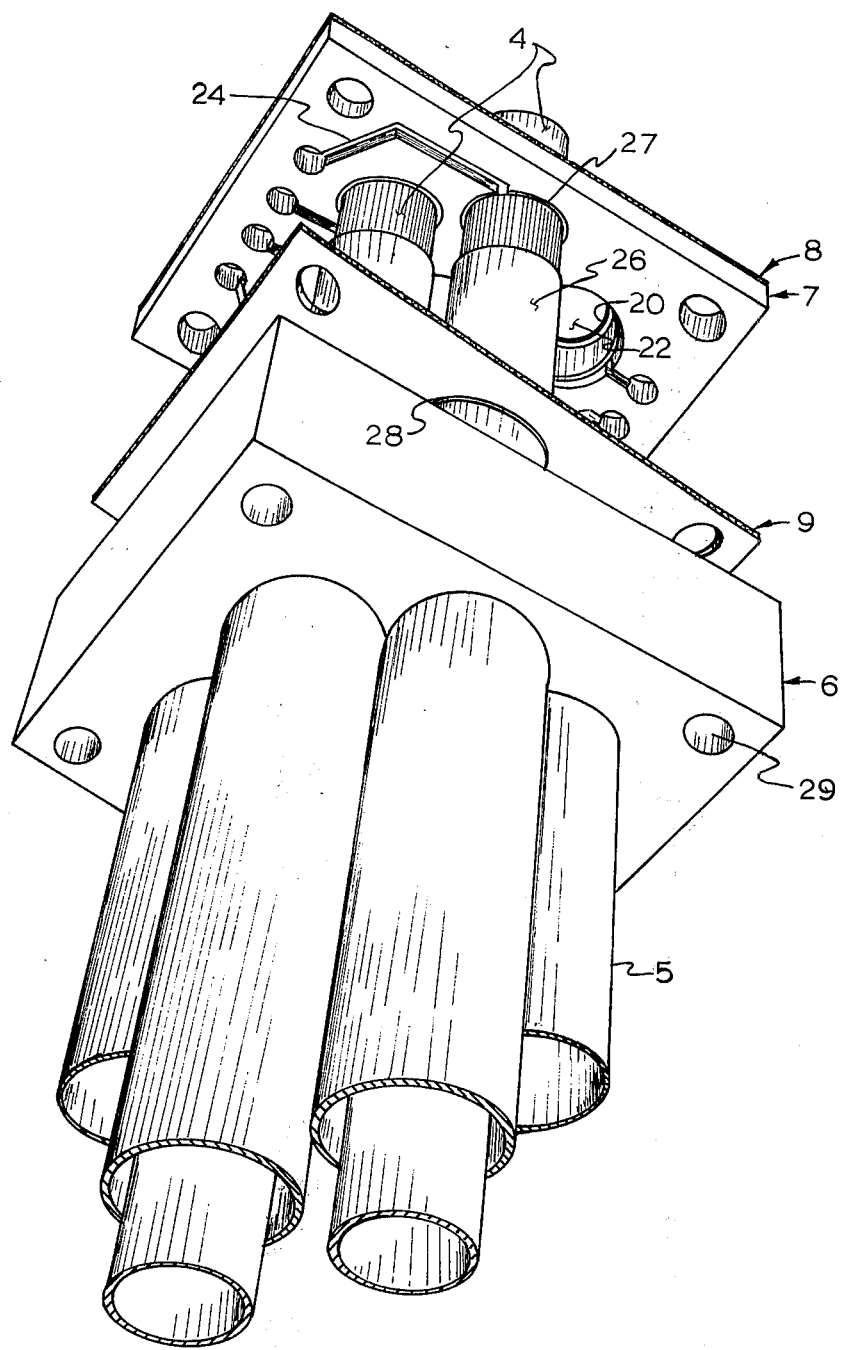
FIG. 7 is a perspective view of the partial assembly of FIG. 8 but seen from the opposite direction.

In FIG. 7, the terminal portions 4 of the permeable tubes 26 are shown within the passageways 22 in plate 7. These portions fit lossely within the enlarged portions of the passageways and closely within the restricted portions. The terminal portions 4 are impermeable for a distance such that the permeable portions 26 will not extend beyond the end of the outer, supporting tubes 5 when the module is assembled (as in FIG. 1). Permeate traveling along the outer surfaces of the terminal tube portions 4 cannot pass beyond the gasket lips 20 on the other side of the plate and flows, in the spaces 27 between the tube surface and the enlarged portions of the passageway in the plate, to the collecting grooves 24. Also shown is the gasket 9 having openings 28 through which pass loosely the terminal portions 4 of tubes 26 and which are large enough to allow egress of permeate from the ends of the grooves (see FIG. 8) in the interior surfaces of the supporting tubes 5. The bores 29 in the tube sheet member 6 are tapped to engage the male threads on the bolt ends (14b, in FIG. 3).

Figure 8:
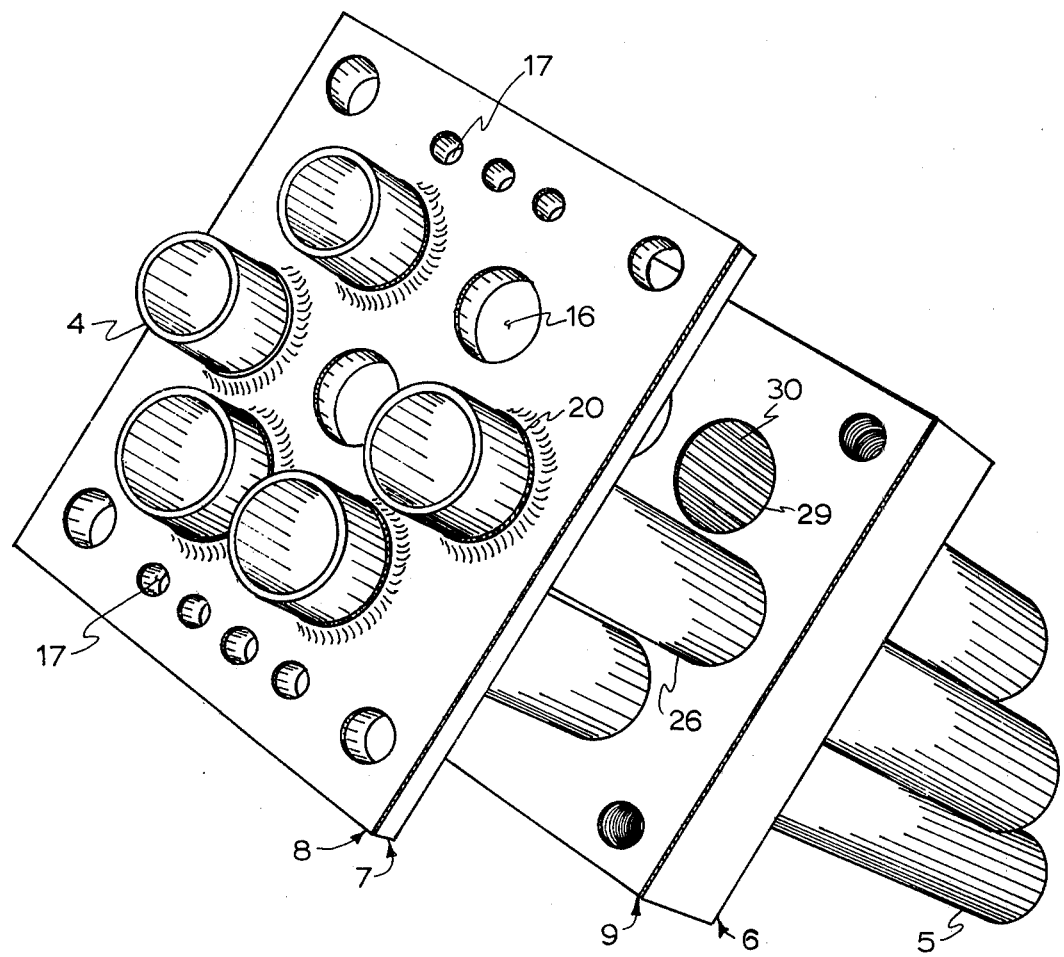
FIG. 8 is perspective view of part of the assembly of FIG. 1, showing the grooved interior of an outer tube, the tube-sheet member, the non-grooved face of the permeate collecting plate, the terminal portions of the inner tubes which pass through the plate and are received in the feed passageways in the block and the cooperating gaskets on each side of the plate.

In FIG. 8, the grooves 30 inside one of tubes 5 and a corresponding opening 29 in gasket 9 are shown. Similarly, openings 16 and 17 in gasket 8 and the impermeable terminal portions 4 of tubes 26 are shown. The membrane linings inside the latter tubes are not depicted.

Figure 9:
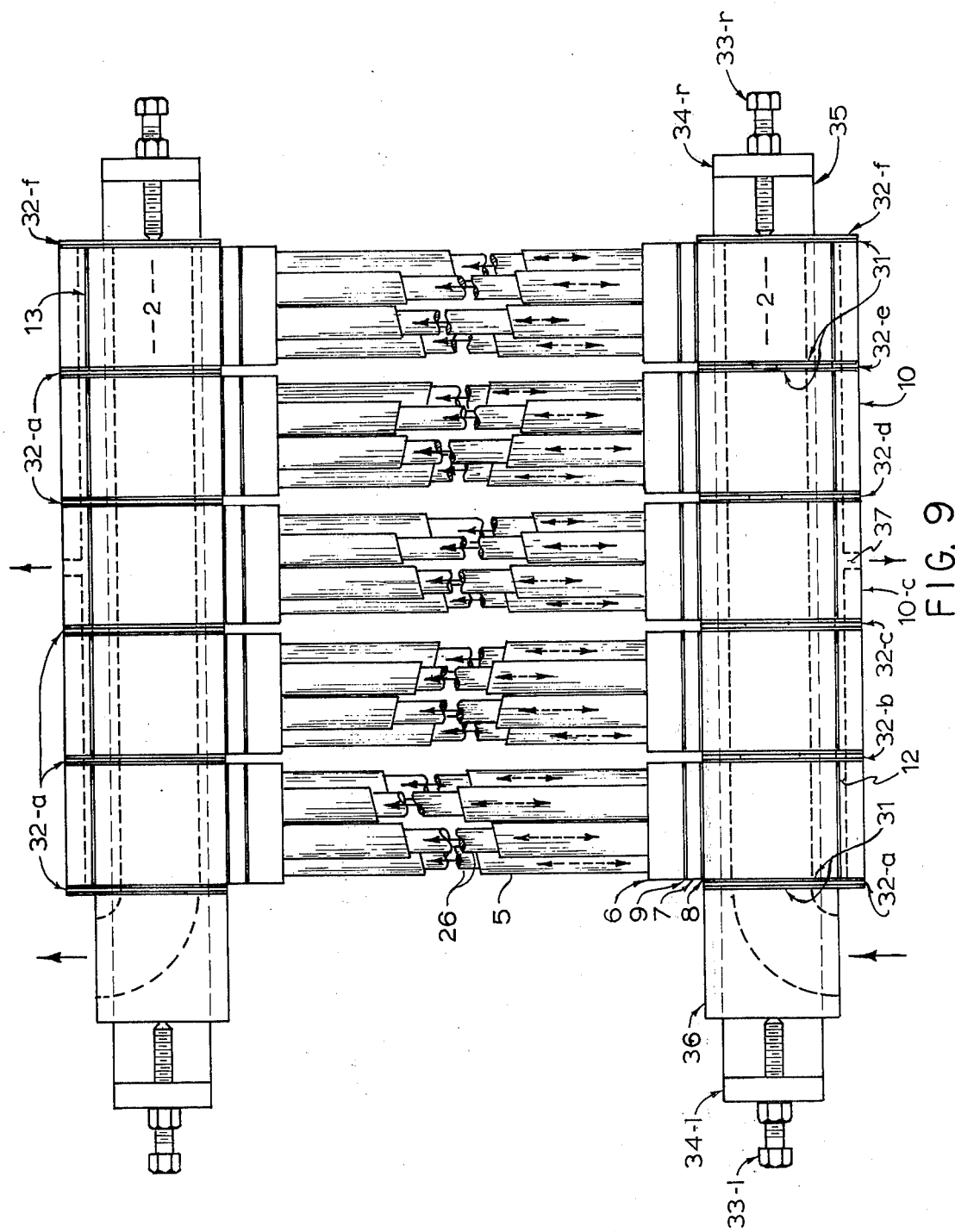
FIG. 9 is a plan view of a ganged array of modules of the type illustrated in FIG. 1, together with a mounting frame member and clamps.

A plan view of a ganged array of five modules is shown in FIG. 9. At the right end of the lower half of the array, a gasket 31 (as in FIG. 10, openings 38 and 39 could be omitted) is sealingly urged against the portion of the adjacent face, of header block 1, peripheral to the opening of the bore 2, by the action of set bolt 33-r which bears against rigid metal baffle plate 32-f (see FIG. 11). Frame member 34-r, through which bolt 33-r is threaded, is contiguous with or fastened to a base member 35 which extends under the array to an identical frame member 34-l and bolt 33-l at the left end of the assembly. Bolt 33-l bears against an elbow block 36 with functions as the feed inlet for the assembly. The latter block in turn bears against baffle plate 32-a (see FIG. 11), which in turn compresses gasket 31 (as in FIG. 10; opening 38 may be omitted). Between each adjacent pair of header blocks in the array is placed a baffle plate 32 having a gasket 31 (or other sealing means) on each side of it. The opening (39, in FIG. 10) in each gasket is sized to match the corresponding opening (40, in FIG. 11), which is smaller in each succeeding baffle (a through e in FIG. 11) from left to right.

The other half of the array (uppermost in the drawing) is disposed in mirror-image relationship to the lower half. The elbow block in the mirror-image half functions as an egress conduit for treated feed.

Permeate is collected from either header block/end plate assembly (or both). In the array shown in FIG. 9, permeate is conveyed through channels 12 in end-plates 10, one of which (10-c) is adapted by means of fluid passageway 37 to permit egress of collected permeate from each half of the array.

MATERIAL AND METHODS OF CONSTRUCTION

The header block preferably consists of aluminum-filled epoxy and is formed by molding or casting. However, any otherwise suitable material of requisite rigidity, strength and fabricability may be employed and any other suitable method of manufacture may be used. The same options hold for the permeate collecting plate and tube-sheet member. It is preferred that the support-tube ends be "potted" in the tube-sheet material. However, it is only necessary that their positions relative to each other and to the rest of the module be fixed by a means which, in cooperation with gasket means, the support tube ends and the protruding, impermeable portions of the inner tubes, will direct permeate flow exclusively into the collecting channels in the adjacent face of the collecting plate.

Suitable materials, shapes and methods of construction of the permeable, membrane-lined inner tubes and the impermeable supporting tubes are generally as disclosed in U.S. Pat. Nos. 3,581,900, 3,666,109 and 3,708,069. Preferred support-tube materials are polyterephthalates, such as "6G91", available from Eastman Kodak Co. Other suitable materials are polyvinyl chloride, ABS resins, metals, fiber-glass, etc. Typical cylindrical support-tube dimensions are 0.75 inches (1.91 cm) O.D., 0.56 inches (1.42 cm) I.D. Typical internal grooving consists of 24 equally spaced, rectangular grooves 0.02 inches (0.51 mm) deep and 0.03 inches (0.76 mm) wide. When the tube ends are to be fixed in the tube sheet by potting, they preferably are formed with several shallow, circumferential grooves in their outer surfaces to improve "locking" in the cured potting resin.

Advantageously, the support tubes — which may have any suitable cross-sectional shape but preferably are cylindrical or hexagonal, are located together as a unitary bundle having superior rigidity and strength. Preferably, this is done by means of adhesion between abutting tube surfaces, as by solvent welding, application of a suitable adhesive or sonic welding. Alternatively, a "bundle" of such tubes may be formed as a single extension or casting, having a honey-comb appearance, viewed end-on.

The impermeable, terminal portions of the inner tubes conveniently take the form of ferrules which are shrunk-fit or formed on a reduced-diameter terminal portion of the permeable tube. Any suitable material may be employed for the ferrules, but ABS resins, polycarbonates (LEXAN, for example) or combinations thereof have been found particularly useful.

The inner, permeable tubes may be formed, by several well known methods, from any suitable material which can be fabricated as or inherently tends to assume a foraminous structure. Porous paper tubes are inexpensive and can be made by known procedures. The membrane linings inside these tubes are formed by known methods from known materials, such as — for example — cellulose acetate, cellulose triacetate, polyvinyl alcohol, etc.

Gaskets employed in the modular assemblies of the present invention may be formed from any otherwise suitable resilient material which is not unduly softened, swollen or otherwise deteriorated by the fluids to be processed and which will not "creep" or "set" to an intolerable extent under the conditions of use contemplated. Rubber is a generally suitable material for the gaskets numbered 8, 9, 13 and 31 in the several Figures of the drawings. For lip gasket 9, materials such as, for example, Neoprene rubber, polyurethane and polyester elastomers and the like have been found particularly suitable. Conveniently, these gaskets are formed by stamping or molding.

If desired, sealing may be effected by use of adhesive layers in place of gaskets. The gaskets 8, between the header blocks and permeate collector plates, are preferably fabricated as true gaskets, however. Since ready disassembly is highly desirable in most applications, adhesive layers are generally a distinctly less preferred sealing means. Of course, one or both surfaces of a given gasket may be glued to the adjacent surface(s) it is compressed against.

End plates (10, in FIG. 1) may be of any suitable material but preferably are made of a transparent plastic, such as an acrylic, or glass.

STRUCTURAL OPTIONS

A generally cubical block shape is preferred as being the most compact and most adaptable for efficient space utilization by stacking, nesting or ganging together. This includes elongate shapes, such as would result from gluing together a plurality of cubical blocks (such as the one shown in FIG. 1 of the drawings) in such manner that their feed bores constitute segments of a single, elongate bore. For reasons of simplicity and efficiency of manufacture, a truly cubical shape is most preferred. Also, disassembly for purposes of replacing defective permeator tubes is much simpler when an array of modules consists of short blocks, each connected to a limited number of tubes.

Preferably, the feed bore in a given header block is at least generally cylindrical.

The permeate receiving and conducting grooves (11 and 12, FIG. 1) may be formed in the surface of the header block to which the end plate is joined, rather than in the end plate itself as shown. Also, the header block surface — grooved or not — may be colored appropriately to facilitate detection of changes in color or light reflecting properties in the permeate.

Similarly, permeate collection at the ends of the support tubes may be accomplished by grooves and annular recesses in the tube sheet surface adjacent to the collector plate. This requires the use of an adhesive layer, or of a gasket (9, in FIG. 1) made of a sufficiently stiff material so that "flow" of the gasket into such recesses between the tube sheet and plate will not be a problem. Also, if a gasket is used, holes therethrough registering with the ends of the grooves in the tube sheet face and with the permeate conducting bores in the plate will be required.

The number of tubes employed in a module of the present invention is not critical and can be more or less than the seven shown in the Figures. However, the hexagonal configuration which results when seven tubes are packed as closely as possible in parallel alignment is inherently the strongest and the most efficient from the standpoint of space utilization. Such configuration is also desirable in that no more than 6 other tubes need be discarded (or salvaged) if one of the support tubes is damaged (the inner tubes are individually replaceable). Of course, when an elongate block such as described earlier herein is used, any number of discrete "bundles" of tubes, or individual tubes may be connected at any suitable intervals along the block.

Still other options within the ambit of the present invention will be apparent to those skilled in the art.

MODES OF OPERATION

The modules of the present invention, when ganged, may be operated in any of several different flow modes, depending on where baffle plates (32-f, in FIG. 11) are placed. For example, in an array such as in FIG. 9, where the upper half of the array is the mirror image of the lower half, feed would flow in the same direction in all modules. This would be analogous to electron flow through parallel resistances in an electrical circuit. A feed flow analagous to electron flow in a series circuit through the same resistors could be obtained as follows:

1. Orifice plates 32-b and 32-d in FIGS. 9 and 11 are each replaced by a solid (baffle) plate 32-f (in FIGS. 9 and 11).
2. Orifice plates 32-c and 32-e are each replaced by a plate, such as 32-a, in which the orifice is no smaller than the feed bores (2, in FIG. 2) in the blocks.
3. The positions of the elbow block (36 in FIG. 9) and the baffle plate (32-f) are reversed in the upper half of the array.
4. In the upper half, the orifice plates corresponding to 32-b and 32-d are replaced by open plates such as 32-a and the plates corresponding to 32-c and 32-e are replaced by solid baffles such as 32-f.

In the latter arragement, the feed flow would be in opposite directions in any pair of adjacent modules.

ORIFICE PLATE FUNCTION

The use of orifice plates between adjacent blocks is not essential to the practice of the present invention and such plates are not required components of a ganged array of modules. They can, however, be employed as a means of balancing or directing feed flows between modules operated in parallel or in series. In the arrangement of FIG. 9, if plates 32-b through 32-e are omitted, or are replaced by plates such as 32-a, fluid inertia in the flowing feed will tend to resist the 90° deflection required to transfer fluid from the main bore (2) into the feed passageways in each block and a disproportionate share of the feed will be taken by the last module. This will result in relatively lower velocities through the permeator tubes in the other modules, which in turn will require higher pumping rates to ensure adequate absolute velocities in the first several sets of tubes. The decrease in size in the successive plates, a through e, is shown exaggerated over what will normally be required.

If no plate is used between a pair of blocks, it is of course not necessary to use more than one gasket (31, in FIGS. 9 and 10) between those two blocks.

The term "feed", as used in the specification and claims, refers to a fluid to be treated, or one which has been treated, by passage through the interiors of permeator tubes.

While the preferred forms of the invention have been shown and described, it is to be understood that all suitable modifications and equivalents which fall within the scope of the folowing claims may be resorted to.

I claim:

1. A header block having:
    1. two opposed, generally planar faces, joined by a feed bore through said block, the axis of said bore being generally perpendicular to each of said faces;
    2. a third generally planar face, to which said bore axis is generally parallel, connected to the bore and pierced by a plurality of generally parallel feed passageways terminating in said bore;
       the walls defining the portions of said passageways adjacent said third face being adapted to receive, position and, in cooperation with suitable sealing means, to sealingly engage terminal portions of tubes inserted therein; and
    3. a fourth generally planar face, opposed and generally parallel to said third face and connected thereto by a plurality of permeate conduits which pass through said block and are not connected with said feed bore.

2. A block as in claim 1 in which the total cross-sectional area of said passageways is not greater than the cross-sectional area of said feed bore.

3. A block, as in claim 1, having said fourth face sealingly engaged with a generally planar surface of an end plate, the resulting assembly being adapted by grooves in said surface or in said face to receive and conduct away permeate issuing from the permeate conduits in said block.

4. An assembly as in claim 3 which is also adapted by one of said grooves, in cooperation with suitable intervening sealing means, to receive and pass on permeate discharged from an adjacent such assembly.

5. An assembly as in claim 3 in which said end plate is transparent.

6. A block, as in claim 1, having said third face sealingly engaged with a first generally planar surface of a permeate-collecting plate having a second generally planar surface opposed and generally parallel to said first surface,
    said plate being pierced through by permeate bores which connect said surfaces and register and communicate with the corresponding permeate conduits in said block,
    said plate also being pierced through from surface to surface by passageways which register and communicate with the fluid passageways in said block, the portion of each of said passageways in said plate, adjacent to the second surface being enlarged by recessing the wall of said portion to define an annular interior shoulder.
    each of said enlarged passageway portions being connected to one of the permeate bores piercing said plate by a groove in said second plate surface,
    the diameter of the non-enlarged portion of each passageway through the plate being essentially the same as that of the portion of the corresponding passageway in said block, the wall of which is adapted to receive a tube end, and
    said sealing engagement between said plate and said block being effected through an intervening first sealing means which is adapted, in cooperation with the block and plate to prevent flow of feed other than in the interiors of tubes inserted in the passageways.

7. A block, plate and sealing means as in claim 6 in which the second face of the plate is sealingly engaged with a generally planar face of a tube-sheet member in which are fixed terminal portions of a parallel array of rigid, impermeable support tubes having longitudinal permeate flow-directing grooves in their interior surfaces and containing closely fitting permeable tubes, the terminal portions of which are impermeable and extend through intervening second sealing means fitting loosely thereabout, through the collecting plate and through said first sealing means in sealing engagement therewith and are received by the portions of the walls of said passageways in said block adapted to receive said tube ends,
    said first and second sealing means being adapted, in cooperation with the other components of the resulting assembly, to ensure that permeate is conducted from the ends of the grooves inside the support tubes along the exterior surfaces of the impermeable portions of the inner tubes to the spaces between them and the enlarged portions of the passageways in the plate and is directed therefrom through the collecting grooves and permeate bores in the plate to the corresponding permeate conduits in the block.

8. An assembly as in claim 7 having sealingly engaged with said fourth face of said block a generally planar surface of an end plate, the resulting module being adapted by grooves in said surface or in said face to receive and conduct away permeate issuing from the permeate conduits in said block.

9. A module as in claim 8 which also is adapted by one of said grooves, in cooperation with suitable sealing means, to receive and pass on permeate discharged from an adjacent such module.

10. A module as in claim 9 wherein said end plate is transparent.

* * * * *

UNITED STATES PATENT OFFICE
CERTIFICATE OF CORRECTION

PATENT NO. : 4,016,078
DATED : April 5, 1977
INVENTOR(S) : George B. Clark

It is certified that error appears in the above-identified patent and that said Letters Patent are hereby corrected as shown below:

Column 3, line 39, delete "in" after the word received and insert

-- by the portions of the walls of -- ;

Column 4, line 59, delete "the" after the word by and insert

-- and -- ;

Column 6, line 56, delete "located" and insert -- locked -- .

Signed and Sealed this

Twenty-eighth Day of June 1977

[SEAL]

Attest:

RUTH C. MASON
*Attesting Officer*

C. MARSHALL DANN
*Commissioner of Patents and Trademarks*